US011979368B2

(12) United States Patent
Zhai et al.

(10) Patent No.: US 11,979,368 B2
(45) Date of Patent: May 7, 2024

(54) METHOD, APPARATUS AND DEVICE FOR DETERMINING CLUSTER NETWORK CARD, AND READABLE STORAGE MEDIUM

(71) Applicant: Inspur Electronic Information Industry Co., Ltd., Jinan (CN)

(72) Inventors: Yunlei Zhai, Jinan (CN); Duan Zhang, Jinan (CN)

(73) Assignee: Inspur Electronic Information Industry Co., Ltd., Jinan (CN)

( * ) Notice: Subject to any disclaimer, the term of this patent is extended or adjusted under 35 U.S.C. 154(b) by 0 days.

(21) Appl. No.: 17/779,356

(22) PCT Filed: Jul. 23, 2020

(86) PCT No.: PCT/CN2020/103698
§ 371 (c)(1),
(2) Date: May 24, 2022

(87) PCT Pub. No.: WO2021/098259
PCT Pub. Date: May 27, 2021

(65) Prior Publication Data
US 2022/0407839 A1 Dec. 22, 2022

(30) Foreign Application Priority Data
Nov. 24, 2019 (CN) .......................... 201911161173.0

(51) Int. Cl.
*H04L 61/5007* (2022.01)
*H04L 69/40* (2022.01)
(Continued)

(52) U.S. Cl.
CPC .......... *H04L 61/5007* (2022.05); *H04L 69/40* (2013.01); *H04L 2101/659* (2022.05); *H04L 2101/695* (2022.05)

(58) Field of Classification Search
CPC . H04L 1/24; H04L 12/66; H04L 41/12; H04L 41/046; H04L 41/0843;
(Continued)

(56) References Cited

U.S. PATENT DOCUMENTS 6,636,499 B1 * 10/2003 Dowling ................. H04L 45/04
370/388
6,928,485 B1 * 8/2005 Krishnamurthy ....... H04L 45/46
709/224
(Continued)

FOREIGN PATENT DOCUMENTS

CN 102223289 A 10/2011
CN 106412039 A 2/2017
(Continued)

OTHER PUBLICATIONS

International Search Report, PCT/CN2020/103698, dated Oct. 29, 2020.
(Continued)

*Primary Examiner* — Dustin Nguyen
(74) *Attorney, Agent, or Firm* — David R. Stevens; Stevens Law Group (57) ABSTRACT

A method and device for determining a cluster network card, and a computer readable storage medium. The method comprises: reading a network segment of a Cluster IP from a configuration file of a current node; determining the type of the network segment of the Cluster IP by means of an address string in the network segment of the Cluster IP; obtaining an IP and a network card corresponding to the type of the network segment of the Cluster IP on the current node; and calculating the network segment of each IP, determining the IP corresponding to the network segment with the same address string as a Cluster IP, and determining the network card where the IP is located as a cluster network card. According to the disclosure, the cluster network card can be
(Continued)

automatically and accurately found according to the configuration file.

6 Claims, 4 Drawing Sheets

(51) Int. Cl.
*H04L 101/659* (2022.01)
*H04L 101/695* (2022.01)

(58) Field of Classification Search
CPC ... H04L 45/748; H04L 63/0485; H04L 45/04; H04L 45/46; H04L 45/028; H04L 45/745; H04L 67/10; H04L 45/7459; H04L 45/74591; H04L 67/125; G06Q 10/10; G06F 9/3004
See application file for complete search history.

(56) References Cited

U.S. PATENT DOCUMENTS

| | | | | |
|---|---|---|---|---|
| 7,219,160 | B1* | 5/2007 | Buchsbaum | H04L 45/74591 |
| | | | | 709/241 |
| 7,725,603 | B1* | 5/2010 | Kanevsky | H04L 45/028 |
| | | | | 709/204 |
| 9,479,475 | B1* | 10/2016 | Mazarick | H04L 12/66 |
| 2003/0046343 | A1* | 3/2003 | Krishnamurthy | H04L 67/125 |
| | | | | 707/E17.119 |
| 2004/0236991 | A1* | 11/2004 | Brundridge | H04L 1/24 |
| | | | | 714/25 |
| 2005/0198049 | A1* | 9/2005 | Ho | H04L 41/12 |
| 2005/0268151 | A1* | 12/2005 | Hunt | H04L 67/10 |
| | | | | 714/4.1 |
| 2007/0171842 | A1* | 7/2007 | Dow | H04L 41/046 |
| | | | | 370/254 |
| 2013/0223441 | A1* | 8/2013 | Meyer | H04L 41/12 |
| | | | | 370/389 |
| 2014/0025920 | A1* | 1/2014 | Stark | G06F 9/3004 |
| | | | | 711/206 |
| 2014/0153573 | A1* | 6/2014 | Ramesh | H04L 45/748 |
| | | | | 370/392 |
| 2014/0376402 | A1* | 12/2014 | Dutt | H04L 41/0843 |
| | | | | 370/254 |
| 2015/0003237 | A1* | 1/2015 | Guerra | H04L 45/7459 |
| | | | | 370/230 |
| 2015/0146724 | A1* | 5/2015 | Leung | H04L 45/745 |
| | | | | 370/392 |
| 2015/0264008 | A1* | 9/2015 | Li | G06Q 10/10 |
| | | | | 709/245 |
| 2016/0380984 | A1* | 12/2016 | Johnson | H04L 63/0485 |
| | | | | 713/153 |
| 2017/0048223 | A1 | 2/2017 | Anantha Padmanaban et al. | |
| 2017/0142016 | A1* | 5/2017 | Shichino | H04L 67/10 |

FOREIGN PATENT DOCUMENTS

| | | |
|---|---|---|
| CN | 106559246 A | 4/2017 |
| CN | 107222320 A | 9/2017 |
| CN | 108989476 A | 12/2018 |
| CN | 109039723 A | 12/2018 |
| CN | 109167687 A | 1/2019 |
| CN | 109474683 A | 3/2019 |
| CN | 110233767 A | 9/2019 |
| CN | 110995805 A | 4/2020 |
| JP | 2012209625 A | 10/2012 |

OTHER PUBLICATIONS

Written Opinion of the International Searching Authority, PCT/CN2020/103698, dated Oct. 29, 2020.
First Office Action, 201911161173.0, dated May 7, 2021.

* cited by examiner

METHOD, APPARATUS AND DEVICE FOR DETERMINING CLUSTER NETWORK CARD, AND READABLE STORAGE MEDIUM

CROSS REFERENCE TO RELATED APPLICATIONS

This application claims priority to Chinese Patent Application No. 201911161173.0, filed to the China National Intellectual Property Administration on Nov. 24, 2019 and entitled "Method, Apparatus and Device for Determining Cluster Network Card, and Readable Storage Medium", which is hereby incorporated herein by reference in its entirety.

TECHNICAL FIELD

The disclosure relates to the technical field of distributed storage clusters, more specifically to a method, apparatus and device for determining a cluster network card, and a computer readable storage medium.

BACKGROUND

A distributed storage cluster is a cluster composed of a plurality of storage node servers, which supports a piece of data to be stored on a plurality of nodes, and each node can acquire complete data through inter-node communication. When a node goes down, complete data recovery can be performed according to a configuration strategy.

In the distributed storage cluster, each node contains a CTDB, which is high-availability management software used to monitor statuses of cluster nodes and allocation of virtual IPs. When a cluster node fails, the virtual IP allocated to this node will drift to other nodes, and read and write services of the failed node will also drift to other nodes accordingly, so that the cluster forms a high-availability cluster. When the node CTDB is started and monitors a cluster network card, each node needs to find the cluster network card of this node, so as to monitor the cluster network card in real time, so that when the cluster network card fails, the CTDB can timely notify the cluster of failover to reduce the impact on services of a client. The cluster network card is a network card used for communication between modules (mainly OSD modules) in the cluster, that is, a network card where a Cluster IP (the IP used for the communication of the OSD modules inside the cluster) is located. However, them is currently no configuration file that indicates which network card on the current node is the cluster network card, and only a network segment of the Cluster IP is known. The OSD will randomly select any IP that uses this network segment during operation.

In conclusion, how to automatically and accurately determine the cluster network card of the node so as to facilitate the real-time monitoring of the cluster network card is a technical problem to be solved urgently by those skilled in the art.

SUMMARY

In view of this, the disclosure aims to provide a method, apparatus and device for determining a cluster network card, and a computer readable storage medium, used to automatically and accurately determining a cluster network card of a current node so as to monitor the cluster network card in real time.

In order to achieve the above objective, the disclosure provides the following technical solutions.

A method for determining a cluster network card includes:
reading a network segment of Cluster IP from a configuration file of a current node;
determining the type of the network segment of Cluster IP by means of an address string in the network segment of Cluster IP;
obtaining IPs and network cards corresponding to the type of the network segment of Cluster IP on the current node; and
calculating the network segment of each IP, comparing the network segment of each IP with the address string, determining the IP corresponding to the same network segment as that of the address string to be a Cluster IP, and determining the network card where the Cluster IP is located to be a cluster network card.

Preferably, when the type of the network segment of the Cluster IP is an IPv4 type of network segment, obtaining IPs and network cards corresponding to the type of the network segment of Cluster IP on the current node includes:
obtaining IPs and network cards corresponding to the IPv4 type of network segment on the current node by means of an ioctl function.

Preferably, calculating the network segment of each IP, comparing the network segment of each IP with the address string, and determining the IP corresponding to the same network segment as that of the address string to be a Cluster IP includes:
performing shift processing on four parts in each IP corresponding to the IPv4 type of network segment respectively to obtain four first integers, and performing bitwise AND operation on the four first integers to obtain one second integer,
performing bitwise AND operation on the second integer and a converted mask to obtain a first value, wherein the converted mask is obtained by performing left shift operation on a mask in the network segment of Cluster IP;
comparing the first value with a second value, and determining the IP corresponding to the first value to be the Cluster IP when the first value is the same as the second value, wherein the second value is obtained by performing bitwise AND operation on a third integer and the converted mask, and the third integer is obtained by performing shift processing and bitwise AND operation on the address string in the network segment of Cluster IP.

Preferably, when the type of the network segment of the Cluster IP is an IPv6 type of network segment, obtaining IPs and network cards corresponding to the type of the network segment of Cluster IP on the current node includes:
obtaining IPs and network cards corresponding to the IPv6 type of network segment on the current node by means of a getifaddrs function.

Preferably, when the IPs and the network cards corresponding to the IPv6 type of network segment on the current node am obtained by means of the getifaddrs function, the method further includes:
obtaining a mask of each IP, and calculating a mask length of each IP; and
comparing the mask length of each IP with a length of the mask in the network segment of Cluster IP, and discarding the IP if the mask length of the IP is inconsistent with the length of the mask in the network segment of the Cluster IP.

Preferably, if the mask length of the IP is consistent with the length of the mask in the network segment of Cluster IP, calculating a network segment of each IP, comparing the network segment of each IP with the address string, and determining the IP corresponding to the same network segment as that of the address string to be a Cluster IP includes:

converting and storing the IP, which corresponds to the IPv6 type of network segment and has a mask length consistent with the length of the mask in the network segment of Cluster IP into four integers so as to obtain first data;

performing AND operation on the first data and second data, and placing an operation result into the first data correspondingly so as to obtain post-operation first data, wherein the second data is obtained by converting the mask in the network segment of the Cluster IP, and the second data includes four elements with a prefix in the form of successive 1;

comparing the post-operation first data with third data, and determining the IP corresponding to the post-operation first data to be the Cluster IP if respective values in the post-operation first data are correspondingly the same as respective values in the third data, wherein the third data is obtained by converting the address string in the network segment of Cluster IP into IP address data, and converting and storing the IP address data into four integers.

An apparatus for determining a cluster network card includes:

a reading module, configured to read a network segment of Cluster IP from a configuration file of a current node;

a first determination module, configured to determine the type of the network segment of Cluster IP by means of an address string in the network segment of Cluster IP;

an obtaining module, configured to obtain IPs and network cards corresponding to the type of the network segment of Cluster IP on the current node; and a second determination module, configured to calculate a network segment of each IP, compare the network segment of each IP with the address string, determine the IP corresponding to the same network segment as that of the address string to be a Cluster IP, and determine the network card where the Cluster IP is located to be a cluster network card.

Preferably, the obtaining module includes:

a first obtaining unit, configured to obtain, when the type of the network segment of Cluster IP is an IPv4 type of network segment, IPs and network cards corresponding to the IPv4 type of network segment on the current node by means of an ioctl function.

A device for determining a cluster network card includes:
a memory, configured to store a computer program; and
a processor, configured to implement steps of any one of the above method for determining a cluster network card when executing the computer program.

A computer readable storage medium is provided. The computer readable storage medium stores a computer program; and the computer program implements the steps of any one of the above method for determining a cluster network card when executed by a processor.

The disclosure provides a method, apparatus and device for determining a cluster network card, and a computer readable storage medium. The method includes: reading a network segment of Cluster IP from a configuration file of a current node; determining the type of the network segment of Cluster IP by means of an address string in the network segment of Cluster IP; obtaining IPs and network cards corresponding to the type of the network segment of Cluster IP on the current node; and calculating the network segment of each IP, comparing the network segment of each IP with the address string, determining the IP determined by the same network segment as that of the address string to be a Cluster IP, and determining the network card where the Cluster IP is located to be a cluster network card.

In the above technical solution disclosed by the disclosure, the network segment of Cluster IP is read, and the type of the network segment of Cluster IP is determined by means of the address string in the network segment of Cluster IP; the IPs and the network segments corresponding to the type of the network segment of Cluster IP am obtained; then, the network segment of each IP is calculated, and the IP corresponding to the same network segment as that of the same address string in the network segment of Cluster IP is determined to be the Cluster IP; the network card where the Cluster IP is located is determined to be the cluster network card, so as to automatically find the cluster network card according to the configuration file; the Cluster IP and the cluster network card are accurately determined by means of comparing the network segment of each IP in the current node with the address string in the network segment of Cluster IP, so that it is convenient to monitor the cluster network card in real time; and when the cluster network card fails, the cluster can be timely notified, and failover can be performed, so as to ensure the high availability of the cluster.

BRIEF DESCRIPTION OF THE DRAWINGS

In order to describe the embodiments of the disclosure or the technical solutions in the prior art more clearly, drawings required to be used in description of the embodiments or the prior art will be briefly introduced below. Apparently, the drawings in the description below are only some embodiments of the disclosure. Those ordinarily skilled in the art also can obtain other drawings according to the provided drawings without creative work.

DETAILED DESCRIPTION

The technical solutions in the embodiments of the disclosure in combination with the accompanying drawings of the embodiments of the disclosure. Apparently, the described embodiments are only part of the embodiments of the disclosure, not all embodiments. Based on the embodiments in the disclosure, all other embodiments obtained by those of ordinary skill in the art without creative work shall fall within the protection scope of the disclosure.

Figure 1:
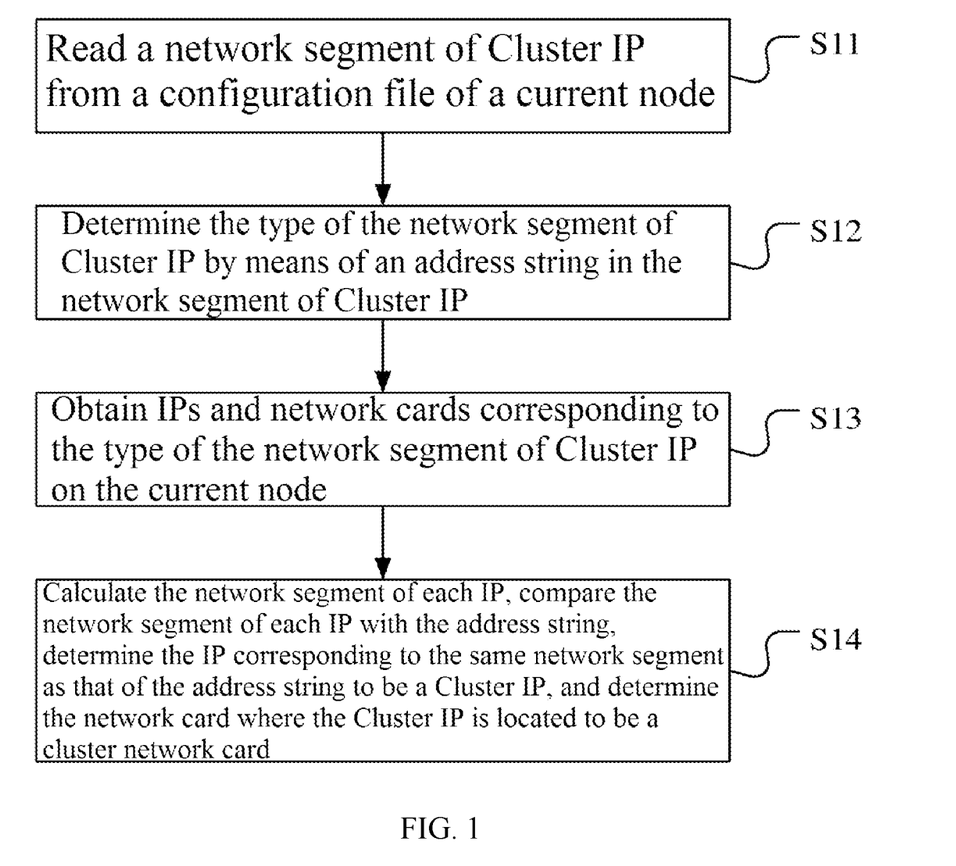
FIG. 1 is a flowchart of a method for determining a cluster network card provided in one embodiment of the disclosure.

Referring to FIG. 1, which is a flowchart of a method for determining a cluster network card provided in one embodiment of the disclosure. The method may include:

S11: reading a network segment of Cluster IP from a configuration file of a current node.

When a CTDB of each node of a cluster is started, the network segment of Cluster IP is read from the configuration file of the current node. The network segment includes an address string addrstr and a mask length mask_len (or referred to as a mask and a mask string). Specifically, the form of the network segment of Cluster IP is, for example: 192.168.2.0/24, wherein 192.168.2.0 is the address string addrstr, and 24 is the mask length mask_len.

S12: determining the type of the network segment of Cluster IP by means of an address string in the network segment of Cluster IP.

After the network segment of Cluster IP is read, the network segment of Cluster IP is analyzed to respectively obtain the address string addrstr and the mask length mask_len, and then whether the type of the network segment of Cluster IP is an IPv4 type of network segment or an IPv6 type of network segment is determined by means of the address string in the network segment of Cluster IP.

IPv4 can be expressed as such a format as 100.7.4.2, which occupies 32 bits in total, that is, a length of one integer. IPv6 can be expressed as such a format as 4444:AABB:1A4B::40, which occupies 128 bits in total, that is, a length of four integers. Therefore, when it is determined whether the type of the network segment of the Cluster IP is an IPv4 type of network segment or an IPv6 type of network segment by means of the address string in the network segment of Cluster IP, if there is ":" in the address string addrstr, the type of the network segment can be regarded as an IPv6 type of network segment, otherwise the type of the network segment is regarded as an IPv4 type of network segment.

S13: obtaining IPs and network cards corresponding to the type of the network segment of Cluster IP on the current node.

After it is determined that the type of the network segment of Cluster IP is IPv4, IPs corresponding to all IPv4s in the current node and network cards where the IPs am located (specifically, network card names of the network cards where the IPs are located can be obtained) can be found. Similarly, after it is determined that the type of the network segment of Cluster IP is IPv6, IPs corresponding to all IPv6s in the current node and network cards where the IPs am located (specifically, network card names of the network cards where the IPs are located can be obtained) can be found.

S14: calculating the network segment of each IP, comparing the network segment of each IP with the address string, determining the IP corresponding to the same network segment as that of the address string to be a Cluster IP, and determining the network card where the Cluster IP is located to be a cluster network card.

The network segment of each IP is calculated, the network segment of each IP is compared with the address string in the network segment of Cluster IP, the IP corresponding to the same network segment as that of the address string is determined to be a Cluster IP, and the network card where the IP (i.e., the Cluster IP) is located is determined to be a cluster network card. Considering that the IP of the same network segment is not assigned to different network cards in a normal case during network partitioning of a node, the screened cluster network card is unique.

Therefore, the cluster network card can be automatically screened by the above method, and the cluster network card can be accurately determined. Therefore, the cluster network card can be monitored in real time in the later stage, so that when the cluster network card fails, the cluster can be timely notified, and failover can be performed, thus ensuring the high availability and stability of the cluster. Furthermore, a user does not need to manually configure the cluster network card when using a CTDB cluster network monitoring function. At the same time, various check problems and a configuration error problem possibly caused by the manual configuration of the cluster network card are also avoided. That is, by the above method, the steps of using and configuring the cluster network card monitoring function are simplified. The method for automatically determining the cluster network card supports both IPv4 and IPv6.

In the above technical solution disclosed by the disclosure, the network segment of Cluster IP is read, the type of the network segment of Cluster IP is determined by means of the address string in the network segment of Cluster IP; the IPs and the network segments corresponding to the type of the network segment of Cluster IP are obtained; then, the network segment of each IP is calculated, and the IP corresponding to the same network segment as that of the same address string in the network segment of Cluster IP is determined to be a Cluster IP, and the network card where the Cluster IP is located is determined to be a cluster network card, so as to automatically find the cluster network card according to the configuration file; the Cluster IP and the cluster network card are accurately determined by means of comparing the network segment of each IP in the current node with the address string in the network segment of Cluster IP, so that it is convenient to monitor the cluster network card in real time; and when the cluster network card fails, the cluster can be timely notified, and failover can be performed, so as to ensure the high availability of the cluster.

According to the method for determining a cluster network card provided in the embodiment of the disclosure, when the type of the network segment of the Cluster IP is an IPv4 type of network segment, obtaining IPs and network cards corresponding to the type of the network segment of Cluster IP on the current node may include:

obtaining IPs and network cards corresponding to the IPv4 type of network segment on the current node by means of an ioctl function.

When it is determined that the type of the network segment of the Cluster IP is IPv4, the IPs and the network cards corresponding to the IPv4 type of network segment on the current node can be obtained by means of the ioctl function, so as to improve the efficiency and accuracy of obtaining the IPs and the network cards.

According to the method for determining a cluster network card provided in the embodiment of the disclosure, calculating the network segment of each IP, comparing the network segment of each IP with the address string, and determining the IP corresponding to the same network segment as that of the address string to be a Cluster IP may include:

performing shift processing on four parts in each IP corresponding to the IPv4 type of network segment respectively to obtain four first integers, and performing bitwise AND operation on the four first integers to obtain one second integer, performing bitwise AND operation on the second integer and a converted mask to obtain a first value, wherein the converted mask is obtained by performing left shift operation on a mask in the network segment of Cluster IP; and comparing the first value with a second value, and determining the IP corresponding to the first value to be the Cluster IP when the first value is the same as the second value, wherein the second value is obtained by performing bitwise AND operation on a third integer and the converted mask, and the third integer is obtained by performing shift processing and bitwise AND operation on the address string in the network segment of Cluster IP.

Figure 2:
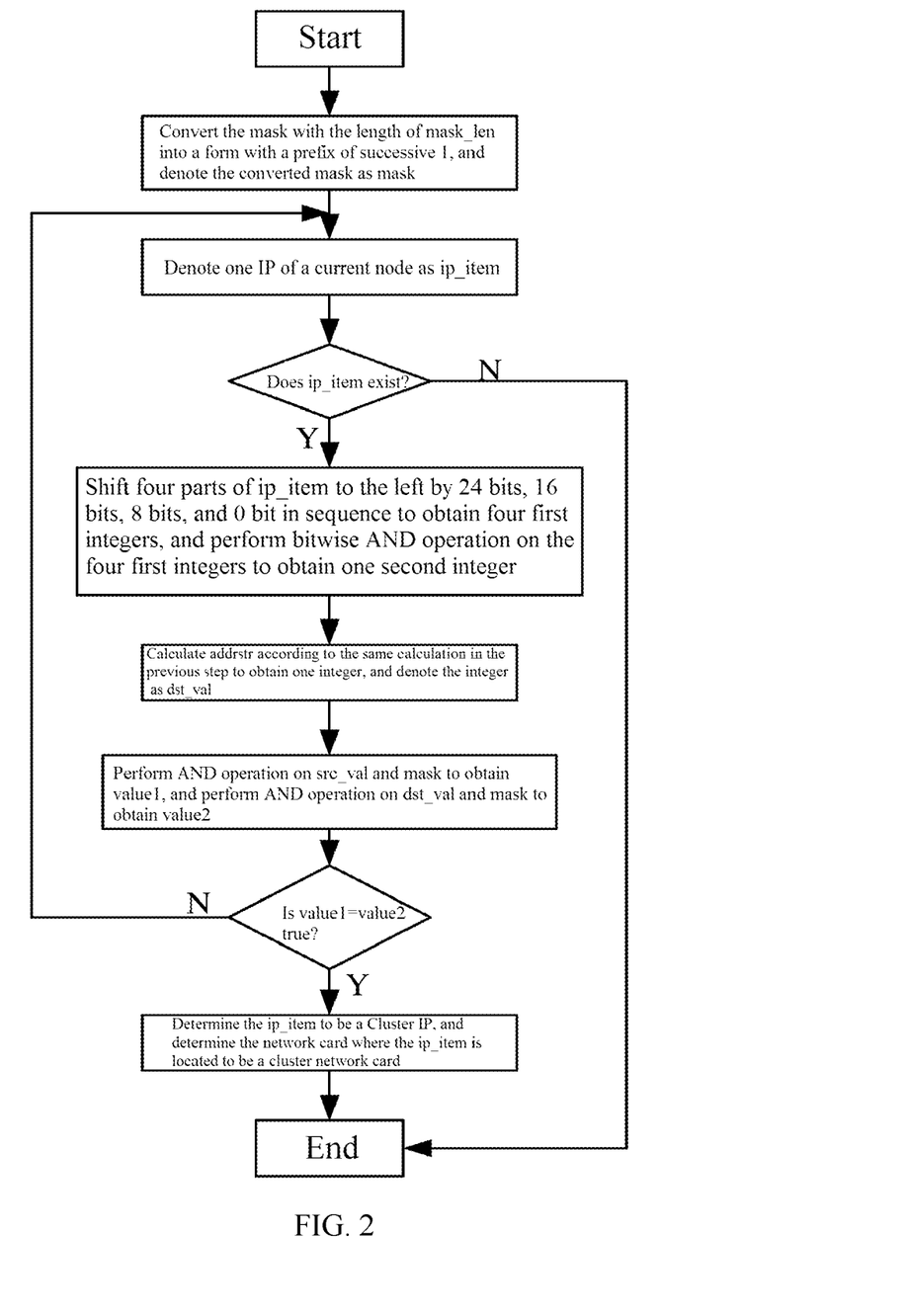
FIG. 2 is a flowchart of screening out a cluster network card from an IP of a current node under an IPv4 environment provided in an embodiment of the disclosure.

When the type of the network segment of Cluster IP is IPv4, the process of determining the Cluster IP and the cluster network card is specifically as follows:

cyclically traversing the IPs corresponding to the IPv4 found by each current node, and denoting each IP as ip_item (wherein the form of the IP is for example: 100.3.2.40); shifting four parts of ip_item by 24 bits, 16 bits, 8 bits, and 0 bit in sequence from left to right (i.e., respectively performing shift processing) so as to obtain four first integers; performing bitwise AND operation on the four integers so as to obtain one second integer, and denoting the second integer as src_val; wherein according to computing features, one IPv4 address (that is, one IP) can uniquely obtain one integer, performing bitwise AND operation on src_val and a converted mask to obtain a first value value1, wherein the converted mask is obtained by performing left shift operation on a mask in the network segment of Cluster IP; specifically, the mask in the network segment of Cluster IP can be converted into a form with a prefix of successive 1 by means of the left shift operation 0xFFFFFFFF<<(32-mask_len), so as to obtain the converted mask which is denoted as mask; correspondingly, according to the above, the bitwise AND operation is performed on src_val and mask to obtain one unique integer value (i.e., value1) corresponding to one network segment, that is, according to the computing features, one unique integer value can be obtained from one network segment;

comparing the first value value1 with a second value value2, determining the IP corresponding to the first value value1 to be the Cluster IP when the first value1 is the same as the second value value2, and determining the network card where the IP is located to be a cluster network card. The second value value2 is obtained by performing bitwise AND operation on the third integer dst_val and mask (i.e., the converted mask); the third integer is obtained by performing shift processing and bitwise AND operation on the address string addrstr in the network segment of Cluster IP; specifically, four parts of the address string addrstr am left shifted by 24 bits, 16 bits, 8 bits, and 0 bit in sequence from left to right so as to obtain four first integers; and bitwise AND operation is performed on the four integers to obtain one integer (denoted as dst_val).

The above process may specifically correspondingly refer to FIG. 2, which is a flowchart of screening out a cluster network card from an IP of a current node under an IPv4 environment provided in an embodiment of the disclosure.

According to the method for determining a cluster network card provided in the embodiment of the disclosure, when the type of the network segment of the Cluster IP is an IPv6 type of network segment, obtaining IPs and network cards corresponding to the type of the network segment of Cluster IP on the current node may include:

obtaining IPs and network cards corresponding to the IPv6 type of network segment on the current node by means of a getifaddrs function. When it is determined that the type of the network segment of the Cluster IP is IPv6, the IPs and the network cards corresponding to the IPv6 type of network segment on the current node can be obtained by means of the getifaddrs function, so as to improve the efficiency and accuracy of obtaining the IPs and the network cards.

According to the method for determining a cluster network card, when the IPs and the network cards corresponding to the IPv6 type of network segment on the current node are obtained by means of the getifaddrs function, the method may further include:

obtaining a mask of each IP, and calculating a mask length of each IP; and comparing the mask length of each IP with a length of the mask in the network segment of Cluster IP, and discarding the IP if the mask length of the IP is inconsistent with the length of the mask in the network segment of Cluster IP.

When the IPs and the network cards corresponding to the IPv6 type of network segment on the current node am obtained by means of the getifaddrs function, the getifaddrs function can be used to obtain the mask of each IP at the same time, and the mask length of each IP can be then calculated and is denoted as mask_len_item. Later, the mask length mask_len_item of each IP can be compared with the length mask_len of the mask in the network segment of Cluster IP; if they are inconsistent, it is determined that the IP is not the Cluster IP; and at this time, the IP can be directly discarded, so as to improve the efficiency of determining the Cluster IP and the cluster network card.

According to the method for determining a cluster network card provided in the embodiment of the disclosure, if the mask length of the IP is consistent with the length of the mask in the network segment of Cluster IP, calculating a network segment of each IP, comparing the network segment of each IP with the address string, and determining the IP corresponding to the same network segment as that of the address string to be a Cluster IP may include:

converting and storing the IP, which corresponds to the IPv6 type of network segment and has a mask length consistent with the length of the mask in the network segment of Cluster IP into four integers so as to obtain first data;

performing AND operation on the first data and second data, and placing an operation result into the first data correspondingly so as to obtain post-operation first data, wherein the second data is obtained by converting the mask in the network segment of Cluster IP, and the second data includes four elements with a prefix in the form of successive 1;

comparing the post-operation first data with third data, and determining the IP corresponding to the post-operation first data to be the Cluster IP if respective values in the post-operation first data are correspondingly the same as respective values in the third data, wherein the third data is obtained by converting the address string in the network segment of Cluster IP into IP address data, and converting and storing the IP address data into four integers.

Figure 3:
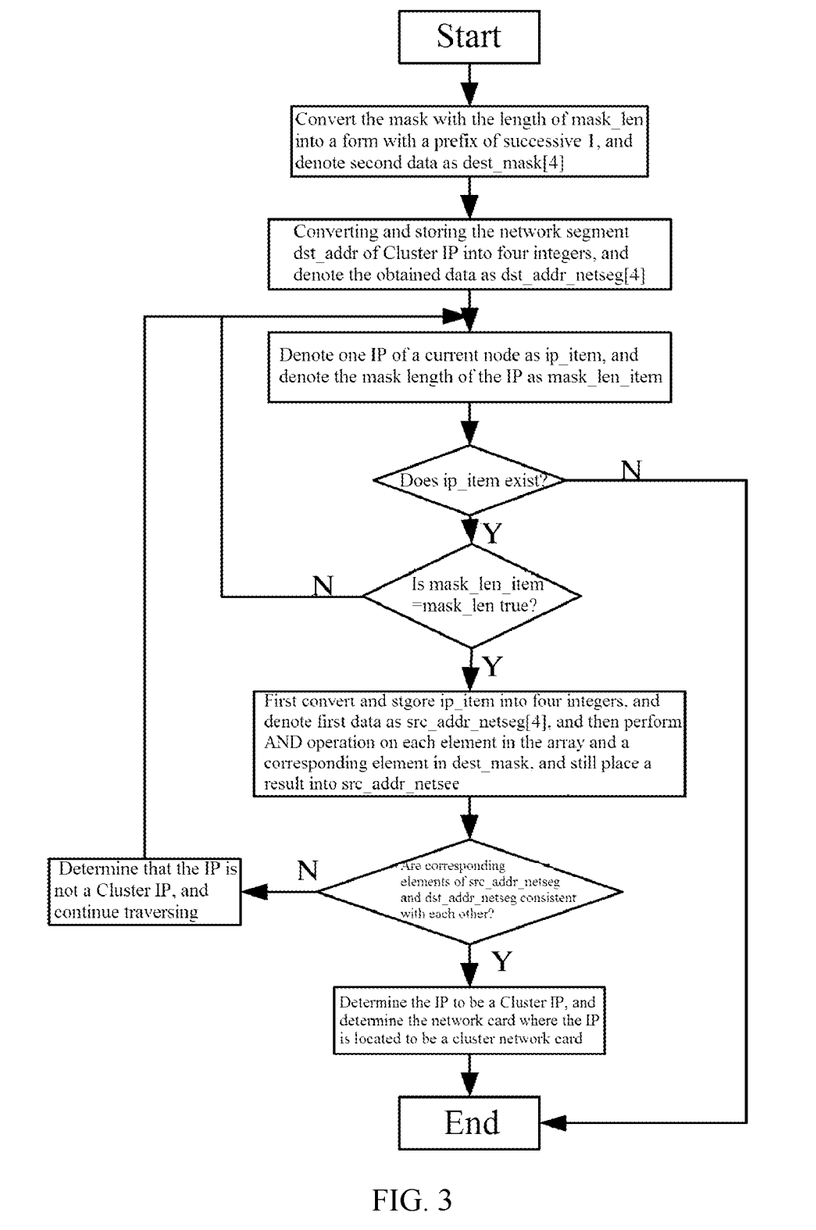
FIG. 3 is a flowchart of screening out a cluster network card from an IP of a current node under an IPv6 environment provided in an embodiment of the disclosure.

If the mask length mask_len_item of the IP is consistent with the length mask_len of the mask in the network segment of Cluster IP, the process of determining the Cluster IP and the cluster network card is specifically as follows:

denoting the IP, which corresponds to the IPv6 type of network segment and has a mask length mask_len_item consistent with the length mask_len of the mask in the network segment of Cluster IP, as ip_item, and calculating the network segment of the ip_item, wherein the network segment calculating process is as follows:

converting and storing ip_item into four integers so as to obtain the first data (which is denoted as src_addr_netseg[4], wherein "4" here represents four elements); performing AND operation (0≤i<4) on the first data src_addr_netseg[i] and second data dest_mask[i], and placing an operation result into the first data src_addr_netseg[i] correspondingly so as to obtain post-operation first data (which is still expressed by src_addr_netseg[i] here), thus obtaining the network segment corresponding to the IP. The second data dest_mask[4] is obtained by converting the mask in the network segment of Cluster IP; and the second data dest_mask[4] includes four elements with a prefix in the form of successive 1. Specifically, the second data dest_mask[4] is obtained by converting the mask with the length of mask_len in the network segment of Cluster IP into a form with a prefix of successive 1, and each element is one integer. The process of obtaining dest_mask[4] is approximately as follows: firstly, initializing each element of dest_mask into 0xFFFFFFFF; and secondly, arranging the four elements in sequence, and shifting the whole to the left by the length mask_len so as to obtain the second data dest_mask[4] with a prefix in the form of successive 1. Of course, the second data dest_mask[4] may also be obtained in other ways. The disclosure does not make any limitation to this;

then, comparing the post-operation first data src_addr_netseg[i] with third data dst_addr_netseg[i] (wherein 0≤i<4), regarding that the IP corresponding to the post-operation first data is the Cluster IP and the network card where the IP is located is a cluster network card if all the corresponding elements are the same, wherein the third data dst_addr_netseg[i] is obtained by converting the address string addrstr in the network segment of Cluster IP into IP address data dst_addr, and converting and storing the IP address data dst_addr into four integers, and denoting the obtained data as dst_addr_netseg[4].

The above process may specifically correspondingly refer to FIG. 3, which is a flowchart of screening out a cluster network card from an IP of a current node under an IPv6 environment provided in an embodiment of the disclosure.

Figure 4:
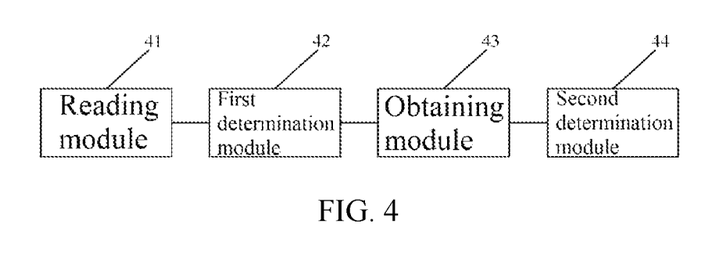
FIG. 4 is a structural schematic diagram of an apparatus for determining a cluster network card provided in one embodiment of the disclosure.

An embodiment of the disclosure further provides an apparatus for determining a cluster network card. Referring to FIG. 4, which is a structural schematic diagram of an apparatus for determining a cluster network card provided in the embodiment of the disclosure. The apparatus may include:

a reading module 41, configured to read a network segment of Cluster IP from a configuration file of a current node;

a first determination module 42, configured to determine the type of the network segment of Cluster IP by means of an address string in the network segment of Cluster IP;

an obtaining module 43, configured to obtain IPs and network cards corresponding to the type of the network segment of Cluster IP on the current node; and a second determination module 44, configured to calculate a network segment of each IP, compare the network segment of each IP with the address string, determine the IP corresponding to the same network segment as that of the address string to be a Cluster IP, and determine the network card where the Cluster IP is located to be a cluster network card.

According to the apparatus for determining a cluster network card provided in the embodiment of the disclosure, the obtaining module 43 may include:

a first obtaining unit, configured to obtain, when the type of the network segment of Cluster IP is an IPv4 type of network segment, IPs and network cards corresponding to the IPv4 type of network segment on the current node by means of an ioctl function.

According to the apparatus for determining a cluster network card provided in the embodiment of the disclosure, the second determination module 44 may include:

a shift processing unit, configured to perform shift processing on four parts in each IP corresponding to the IPv4 type of network segment respectively to obtain four first integers, and perform bitwise AND operation on the four first integers to obtain one second integer, a bitwise AND operation unit, configured to perform bitwise AND operation on the second integer and a converted mask to obtain a first value, wherein the converted mask is obtained by performing left shift operation on a mask in the network segment of the Cluster IP; and a first comparison unit, configured to compare the first value with a second value, and determine the IP corresponding to the first value to be the Cluster IP when the first value is the same as the second value, wherein the second value is obtained by performing bitwise AND operation on a third integer and the converted mask, and the third integer is obtained by performing shift processing and bitwise AND operation on the address string in the network segment of Cluster IP.

According to the apparatus for determining a cluster network card provided in the embodiment of the disclosure, the obtaining module 43 may include:

a second obtaining unit, configured to obtain, when the type of the network segment of Cluster IP is an IPv6 type of network segment, IPs and network cards corresponding to the IPv6 type of network segment on the current node by means of a getifaddrs function.

The apparatus for determining a cluster network card provided in one embodiment of the disclosure may further include:

a calculation module, configured to, when the IPs and the network cards corresponding to the IPv6 type of network segment on the current node are obtained by means of the getifaddrs function, obtain a mask of each IP, and calculate a mask length of each IP; and a discarding module, configured to compare the mask length of each IP with a length of the mask in the network segment of Cluster IP, and discarding the IP if the mask length of the IP is inconsistent with the length of the mask in the network segment of Cluster IP.

According to the apparatus for determining a cluster network card provided in the embodiment of the disclosure, the second determination module 44 may include:

a first data obtaining unit, configured to, if the mask length of the IP is consistent with the length of the mask in the network segment of Cluster IP, convert and store the IP, which corresponds to the IPv6 type of network segment and has a mask length consistent with the length of the mask in the network segment of Cluster IP into four integers so as to obtain first data;

a post-operation first data obtaining unit, configured to perform AND operation on the first data and second data, and place an operation result into the first data correspondingly so as to obtain post-operation first data, wherein the second data is obtained by converting the mask in the network segment of Cluster IP, and the second data includes four elements with a prefix in the form of successive 1; and a second comparison unit, configured to compare the post-operation first data with third data, and determine the IP corresponding to the post-operation first data to be the Cluster IP if respective values in the post-operation first data are correspondingly the same as respective values in the third data, wherein the third data is obtained by converting the address string in the network segment of Cluster IP into IP address data, and converting and storing the IP address data into four integers.

Figure 5:
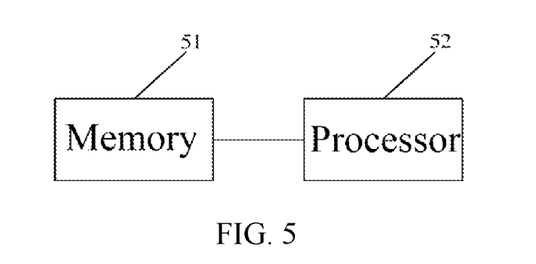
FIG. 5 is a structural schematic diagram of a device for determining a cluster network card provided in one embodiment of the disclosure.

An embodiment of the disclosure further provides a device for determining a cluster network card. Referring to FIG. 5, which is a structural schematic diagram of a device for determining a cluster network card provided in the embodiment of the disclosure. The device may include:

a memory 51, configured to store a computer program; and a processor 52, configured to execute the computer program stored in the memory 51 to implement the following steps: reading a network segment of Cluster IP from a configuration file of a current node; determining the type of the network segment of Cluster IP by means of an address string in the network segment of Cluster IP; obtaining IPs and network cards corresponding to the type of the network segment of Cluster IP on the current node; and calculating the network segment of each IP, comparing the network segment of each IP with the address string, determining the IP corresponding to the same network segment as that of the address string to be a Cluster IP, and determining the network card where the Cluster IP is located to be a cluster network card.

An embodiment of the disclosure further provides a computer readable storage medium which stores a computer program. The computer program, when executed by a processor, may implement the following steps:

reading a network segment of Cluster IP from a configuration file of a current node; determining the type of the network segment of Cluster IP by means of an address string in the network segment of Cluster IP; obtaining IPs and network cards corresponding to the type of the network segment of Cluster IP on the current node; and calculating the network segment of each IP, comparing the network segment of each IP with the address string, determining the IP corresponding to the same network segment as that of the address string to be a Cluster IP, and determining the network card where the Cluster IP is located to be a cluster network card.

The descriptions of related parts in the apparatus and device for determining a cluster network card, and the computer readable storage medium provided in the embodiments of the disclosure may refer to the detailed description of the corresponding part in the method for determining a cluster network card provided in the embodiment of the disclosure, and am not repeatedly described here.

It should be noted that in this context, relational terms such as first and second are used merely to distinguish one entity or operation from another entity or operation, instead of necessarily requiring or implying that these entities or operations have any of these actual relationships or orders. The terms "include", "including" or any other variation thereof are intended to encompass a non-exclusive inclusion, so that elements inherent to a process, method, article, or device of a list of elements am included. Without more restrictions, elements defined by a sentence "includes a/an . . . " do not exclude that the process, method, object or device that includes the elements still includes other identical elements. In addition, parts of the above technical solutions provided in the embodiments of the disclosure that am consistent with the implementation principles of the corresponding technical solutions in the prior art are not described in detail, so as to avoid redundant descriptions.

The foregoing description of the disclosed embodiments enables those skilled in the art to be able to implement or use the disclosure. Various modifications to these embodiments will be apparent to those skilled in the art, and the general principles defined herein can be implemented in other embodiments without departing from the spirit or scope of the disclosure. Therefore, the disclosure will not be limited to these embodiments shown in this text, but should conform to the widest scope consistent with the principles and novel features disclosed herein.

What is claimed is:

1. A method for determining a cluster network card for a distributed storage cluster, comprising:

reading a network segment of Cluster IP from a configuration file of a current node, wherein the Cluster IP is an IP used for communication between OSD modules inside the distributed storage cluster;

determining a type of the network segment of Cluster IP by means of an address string in the network segment of Cluster IP;

obtaining IPs and network cards corresponding to the type of the network segment of Cluster IP on the current node; and calculating a network segment of each IP of the IPs obtained on the current node, comparing the network segment of each IP with the address string, determining the IP corresponding to the same network segment as that of the address string to be the Cluster IP, and determining the network card where the Cluster IP is located to be the cluster network card for the distributed storage cluster;

when the type of the network segment of Cluster IP is an IPv4 type of network segment, the step of obtaining IPs and network cards corresponding to the type of the network segment of Cluster IP on the current node comprises: obtaining IPs and network cards corresponding to the IPv4 type of network segment on the current node by means of an ioctl function;

the step of calculating a network segment of each IP of the IPs obtained on the current node, comparing the network segment of each IP with the address string, and determining the IP corresponding to the same network segment as that of the address string to be the Cluster IP comprises:

performing shift processing on four parts in each IP corresponding to the IPv4 type of network segment respectively to obtain four first integers by left-shifting the four parts in each IP by 24 bits, 16 bits, 8 bits, and 0 bit in sequence from left to right, and performing a bitwise AND operation on the four first integers to obtain one second integer;

performing a bitwise AND operation on the second integer and a converted mask to obtain a first value, wherein the converted mask is obtained by performing left shift operation on a mask in the network segment of Cluster IP; and comparing the first value with a second value, and determining the IP corresponding to the first value to be the Cluster IP when the first value is the same as the second value, wherein the second value is obtained by performing a bitwise AND operation on a third integer and the converted mask, and the third integer is obtained by performing shift processing and a bitwise AND operation on the address string in the network segment of Cluster IP, wherein the shift processing is performed by left-shifting four parts of the address string by 24 bits, 16 bits, 8 bits, and 0 bit in sequence from left to right.

2. The method for determining a cluster network card according to claim 1, wherein, when the type of the network segment of Cluster IP is an IPv6 type of network segment, the step of obtaining IPs and network cards corresponding to the type of the network segment of Cluster IP on the current node comprises:

obtaining IPs and network cards corresponding to the IPv6 type of network segment on the current node by means of a getifaddrs function.

3. The method for determining a cluster network card according to claim 2, wherein, when the IPs and the network cards corresponding to the IPv6 type of network segment on the current node are obtained by means of the getifaddrs function, the method further comprises:

obtaining a mask of each IP, and calculating a mask length of each IP; and comparing the mask length of each IP with a length of the mask in the network segment of Cluster IP, and discarding the IP if the mask length of the IP is inconsistent with the length of the mask in the network segment of Cluster IP.

4. The method for determining a cluster network card according to claim 2, wherein, if the mask length of the IP is consistent with the length of the mask in the network segment of Cluster IP, the step of calculating a network segment of each IP of the IPs obtained on the current node, comparing the network segment of each IP with the address string, and determining the IP corresponding to the same network segment as that of the address string to be the Cluster IP comprises:

converting and storing the IP, which corresponds to the IPv6 type of network segment and has a mask length consistent with the length of the mask in the network segment of Cluster IP, into four integers so as to obtain first data;

performing AND operation on the first data and second data, and placing an operation result into the first data correspondingly so as to obtain post-operation first data, wherein the second data is obtained by converting the mask in the network segment of Cluster IP, and the second data comprises four elements with a prefix in the form of successive 1; and comparing the post-operation first data with third data, and determining the IP corresponding to the post-operation first data to be the Cluster IP if respective values in the post-operation first data are correspondingly the same as respective values in the third data, wherein the third data is obtained by converting the address string in the network segment of Cluster IP into IP address data, and converting and storing the IP address data into four integers.

5. A device for determining a cluster network card, comprising:

a memory, configured to store a computer program; and a processor, configured to implement steps of the method for determining a cluster network card according to of claim 1 when executing the computer program.

6. A non-transitory computer readable storage medium, wherein, the non-transitory computer readable storage medium stores a computer program; and the computer program implements the steps of the method for determining a cluster network card according to of claim 1 when executed by a processor.

* * * * *